(12) United States Patent
Fourney

(10) Patent No.: US 10,781,052 B2
(45) Date of Patent: Sep. 22, 2020

(54) DYNAMIC GAPPING CONVEYOR SYSTEM

(71) Applicant: Laitram, L.L.C., Harahan, LA (US)

(72) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 68 days.

(21) Appl. No.: 16/098,555

(22) PCT Filed: Apr. 26, 2017

(86) PCT No.: PCT/US2017/029511
§ 371 (c)(1),
(2) Date: Nov. 2, 2018

(87) PCT Pub. No.: WO2017/200723
PCT Pub. Date: Nov. 23, 2017

(65) Prior Publication Data
US 2020/0109011 A1  Apr. 9, 2020

Related U.S. Application Data

(60) Provisional application No. 62/339,245, filed on May 20, 2016.

(51) Int. Cl.
*B65G 43/08* (2006.01)
*B65G 43/10* (2006.01)
*B65G 47/31* (2006.01)

(52) U.S. Cl.
CPC ............. *B65G 47/31* (2013.01); *B65G 43/08* (2013.01); *B65G 43/10* (2013.01);
(Continued)

(58) Field of Classification Search
CPC ......... B65G 43/08; B65G 43/10; B65G 47/31
(Continued)

(56) References Cited

U.S. PATENT DOCUMENTS 4,227,607 A * 10/1980 Malavenda ............. B64F 1/368
198/460.1
5,267,638 A * 12/1993 Doane .................... B65G 43/08
198/357
(Continued)

FOREIGN PATENT DOCUMENTS

| JP | H092648 A | 1/1997 |
| JP | 2015089842 A | 5/2015 |
| WO | 0066280 A2 | 11/2000 |

OTHER PUBLICATIONS

Extended European Search Report, European Application No. 17799848.1, dated Mar. 6, 2020. European Patent Office, Munich Germany.

*Primary Examiner* — Douglas A Hess
(74) *Attorney, Agent, or Firm* — James T. Cronvich (57) ABSTRACT

A conveyor system conveying packages with controlled gaps or pitches to a processing station and a method for controlling the speed of an infeed conveyor to supply packages to the processing station with maximized throughput. The conveyor system comprises the infeed conveyor followed by a separation conveyor, a gapping conveyor, and a processing conveyor delivering packages to the processing station. The length of a string of packages and interpackage gaps is measured on the separation conveyor and compared to the length of a string of packages on the processing conveyor. If the string length on the processing conveyor exceeds the string length on the separation conveyor, a programmed controller adjusts the infeed speed down. If the string length on the separation conveyor exceeds the string length on the processing conveyor, the controller adjusts the infeed speed up.

16 Claims, 6 Drawing Sheets

(52) U.S. Cl.
CPC ............... *B65G 2203/0233* (2013.01); *B65G 2203/0291* (2013.01); *B65G 2203/044* (2013.01)

(58) Field of Classification Search
USPC ...... 198/444, 460.1, 461.1, 461.2, 575, 576, 198/577
See application file for complete search history.

(56) References Cited

U.S. PATENT DOCUMENTS

| | | | |
|---|---|---|---|
| 5,308,930 A | 5/1994 | Tokutu et al. | |
| 5,479,352 A | 12/1995 | Smith | |
| 6,513,641 B1 * | 2/2003 | Affaticati | B07C 5/36 198/357 |
| 6,629,593 B2 * | 10/2003 | Zeitler | B65G 43/08 198/460.1 |
| 6,751,524 B2 * | 6/2004 | Neary | B65G 43/08 198/444 |
| 7,413,071 B2 | 8/2008 | Zeitler et al. | |
| 8,408,380 B2 | 4/2013 | Doane | |
| 8,855,806 B2 * | 10/2014 | Hara | G06Q 10/08 700/216 |
| 9,280,756 B2 * | 3/2016 | Hara | G05B 15/02 |
| 9,771,222 B2 * | 9/2017 | Schroader | B65G 43/08 |
| 9,776,215 B2 * | 10/2017 | Wargo | B07C 1/02 |
| 10,226,795 B2 * | 3/2019 | Schroader | B65G 43/10 |
| 2007/0144868 A1 | 6/2007 | Zeitler et al. | |
| 2011/0196877 A1 | 8/2011 | Sakagami et al. | |

\* cited by examiner

DYNAMIC GAPPING CONVEYOR SYSTEM

BACKGROUND

The invention relates generally to power-driven conveyors and in particular to controlling conveyor speed upstream of a processing station to maximize throughput.

In many package-handling applications, packages on a conveyor have to be sorted, weighed, or scanned. And in many of those cases, the packages must be sorted, weighed, scanned, or otherwise processed individually. So packages are commonly conveyed in single file separated by interpackage gaps. Gapping conveyors are used to deliver packages either with a fixed gap length or at a fixed pitch to the downstream processing conveyor feeding the sorter, scale, or scanner. The processing conveyor is generally run at a constant speed determined by the processing speed of the sorter, scale, or scanner. If the speed of the infeed conveyor or other conveyors upstream of the gapper is too high, packages accumulate and the gapping conveyor has to be stopped. Because of latency in stopping and restarting, throughput is compromised. If, on the other hand, the speed of the infeed conveyor is too low, the rate of delivering packages is below the capacity of the processing station.

SUMMARY

One version of a conveyor system embodying features of the invention comprises an infeed conveyor conveying packages at an infeed speed and a separation conveyor receiving the packages from the infeed conveyor and conveying the packages in a conveying direction at a separation speed greater than the infeed speed to separate consecutive packages across gaps. A sensor detects the lengths of the packages in the conveying direction at a sensing position on the separation conveyor and produces a sensor signal indicative of the lengths of the packages and the gaps. A gapping conveyor receives the packages from the separation conveyor and spaces the packages with a fixed gap length or with a fixed pitch. A processing conveyor receives the packages from the gapping conveyor and delivers the packages at a processing speed to a processing station. A controller receives the sensor signal to compute the lengths of the packages and the gaps on the separation conveyor and makes a speed adjustment to the infeed speed as a function of the lengths of the packages and the gaps.

In another aspect a method of controlling the supply of packages to a processing station, comprises: (a) conveying packages in a single file at an infeed speed; (b) separating the packages across interpackage gaps by accelerating the packages to a separation speed higher than the infeed speed on a separation conveyor; (c) measuring the lengths in a conveying direction of separated packages and the interpackage gaps leading or trailing the packages; (d) computing a string length of a string of a predetermined number of consecutive separated packages and interpackage gaps from the measured lengths; and (e) adjusting the infeed speed as a function of the computed string length.

BRIEF DESCRIPTION OF THE DRAWINGS

These features and aspects of the invention, as well as its advantages, are described in more detail in the following description, appended claims, and accompanying drawings, in which:

DETAILED DESCRIPTION

Figure 1:
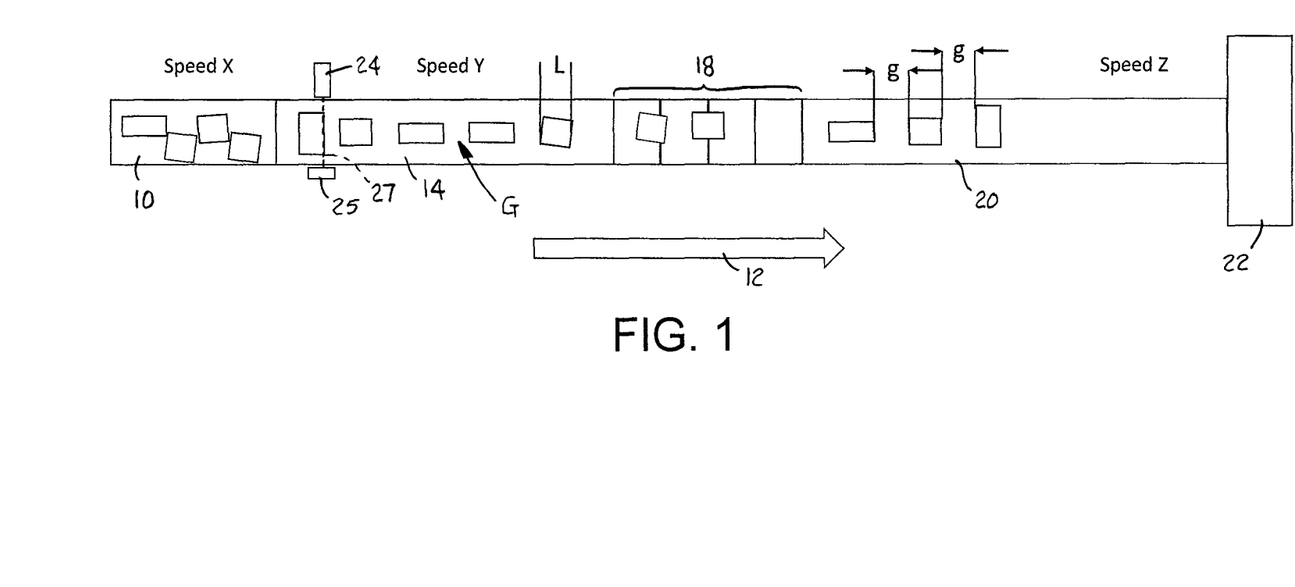
FIG. 1 is a top plan schematic of one version of a conveyor system embodying features of the invention.

One version of a conveyor system embodying features of the invention is shown in FIG. 1. In this version an infeed conveyor 10 running in a conveying direction 12 at an infeed speed X conveys packages in a single file to a separation conveyor 14 running at an accelerated higher separation speed Y. The speed-up provided by the separation conveyor 14 interposes gaps G between the packages. The separation conveyor 14 delivers the packages one at a time to a gapping conveyor, or gapper 18, which comprises a series of smaller conveyors that are selectively and individually started, stopped, or run at different speeds to feed packages to a downstream processing conveyor 20 with a fixed gap g between consecutive packages. The processing conveyor 20 conveys the packages to a processing station 22, such as a sorter, a checkweigher, a scanner, or the like, at a speed Z, corresponding to the rate at which the processing station can process the packages; i.e., the processing-station capacity.

A sensor, such as a photo-eye 24 and reflector 25 or a light curtain, is used to detect the lengths of packages and interpackage gaps G on the separation conveyor 14 at a sensing position 27. The sensing position 27 is far enough downstream of the infeed conveyor 10 that packages being measured have cleared the infeed conveyor and are being conveyed in the conveying direction 12 at the separation conveyor's speed Y. For the optical sensor described, the sensor's light beam is blocked by the passing package. The duration of the blocked beam is proportional to the length L of the package measured in the conveying direction 12. And the time during which the light beam is not blocked is proportional to the length of an interpackage gap G.

The nominal speed Z of the processing conveyor 20 is set to maximize throughput as limited by the capacity of the processing station 22. And the nominal speed X of the infeed conveyor 10 is set to match the rate of product delivery by the processing conveyor 20. For a given fixed gap g between products on the processing conveyor 20, the nominal infeed speed X is set to maximize throughput. If packages on the infeed conveyor 10 are abutting without intervening gaps, the nominal infeed speed X would be set to $Z \cdot L/(L+g)$. For example, if the processing conveyor runs at Z=100 ft/min and requires fixed gaps of g=0.5 ft and all the package lengths L=0.5 ft, the nominal infeed speed X=50 ft/min. If all the package lengths L=1.5 ft and 0.5 ft gaps are required, the nominal infeed speed X=75 ft/min for a fixed processing speed Z=100 ft/min. Because package lengths can vary, the speed X of the infeed conveyor 10 is changed dynamically to maintain maximum throughput by feeding packages at the required rate.

Figure 2:
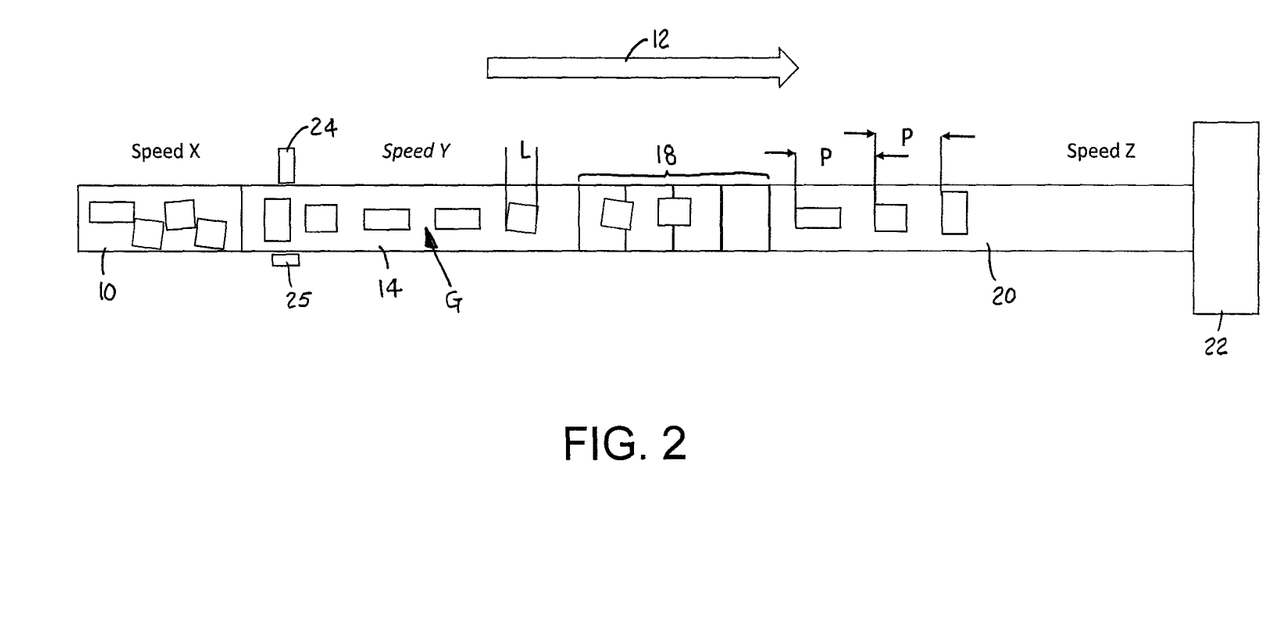
FIG. 2 is a top plan schematic of another version of a conveyor system embodying features of the invention.

A similar conveyor system is shown in FIG. 2. The only difference is that the gapper 18 delivers packages to the processing conveyor 20 so that the pitch P, measured in the conveying direction 12 from trailing end to trailing end or leading end to leading end of consecutive packages, is constant.

Figure 3:
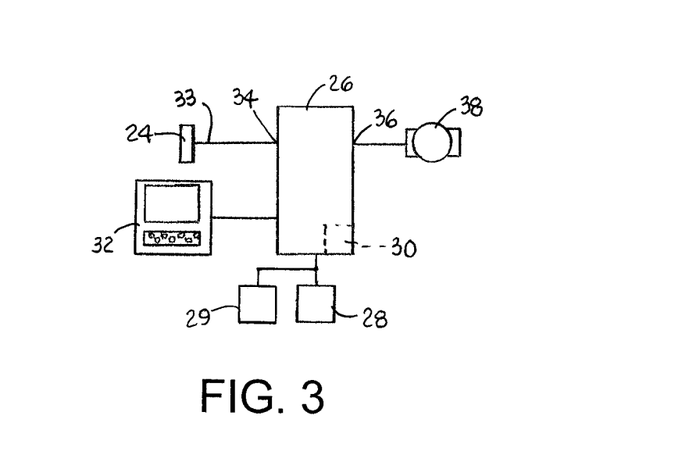
FIG. 3 is a block diagram of a control system usable in a conveyor system as in FIG. 1 or FIG. 2.

The conveyor systems shown in FIGS. 1 and 2 are controlled by a controller 26 as shown in FIG. 3. The controller may be a programmable logic controller, a laptop or desktop computer, or any general-purpose programmable device running a customized software control program, which may be stored in and run from a program memory element 28, such as a ROM or EPROM. Computations and other data are stored in a volatile memory element 29, such as a RAM. The controller 26 also has an internal or external clock 30, or timer. A user interface 32 allows a user to monitor and adjust the operation of the conveyor. The output 33 of the sensor 24 is connected to a controller input 34, such as an edge-detecting input. The controller has an output 36 that controls the speed X of the infeed conveyor via its drive motor or motors 38. The controller 26 can also have other inputs and outputs to control the speeds of the processing conveyor and the separation conveyor, as well as the gapping conveyors. And the controller 26 can have other sensor inputs necessary for controlling the gapping and other conveyors.

Figure 4:
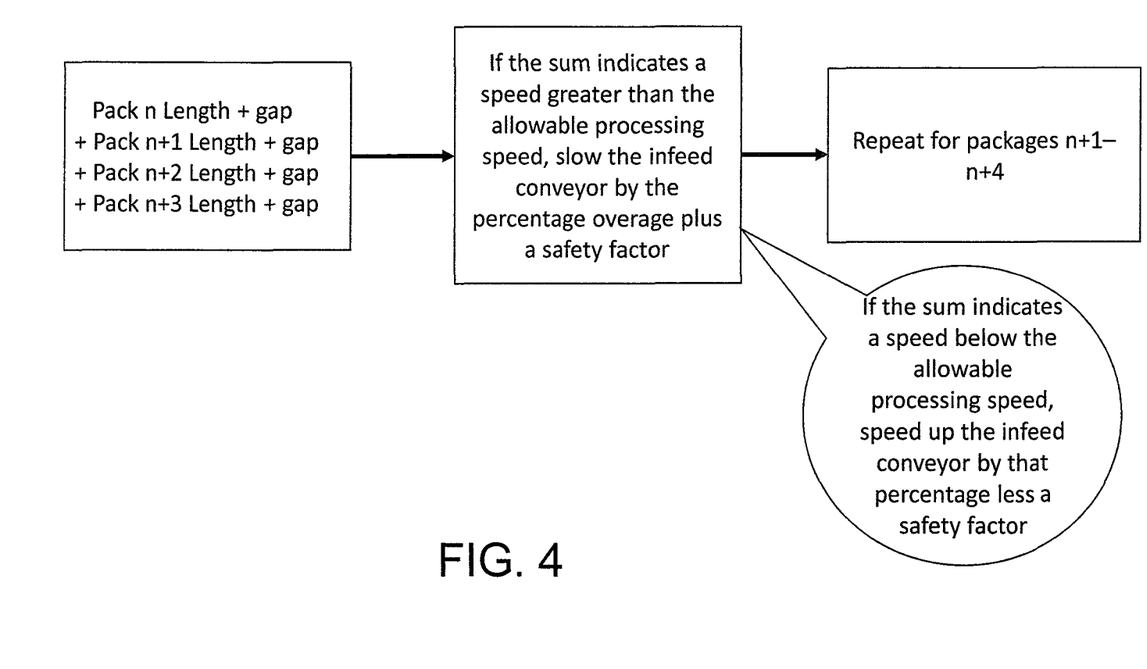
FIG. 4 is a top-level flowchart of one version of a control scheme for operating a conveyor system as in FIG. 1 or FIG. 2.

FIG. 4 is a high-level overview of one version of a control scheme used to adjust the speed of the infeed conveyor to maximize throughput. First, the length of the separation conveyor occupied by four consecutive packages in a package stream and the interpackage gaps immediately preceding or following each of those four packages is measured by adding the lengths of the four packages and the four gaps. That sum is functionally related to the speed of the infeed conveyor: the greater the sum, the slower the speed, and the smaller the sum, the faster the speed. If the sum indicates a speed above the maximum allowable or the desired speed of the processing conveyor, the infeed conveyor's speed is decreased by the percentage the infeed speed is above the processing speed plus, optionally, a safety factor to account for inaccurate length measurements due to sensing errors or side-by-side packages, or doubles. For example, if the average length of a package is 8 in and one in ten packages is a double, a safety factor of 8/10 in (0.8 in) would be added to the sum in determining the speed adjustment. The infeed speed is similarly increased less an optional safety factor if the sum indicates an infeed speed below the speed of the processing conveyor. The sums of package lengths plus gap lengths are computed as a running sum updated by dropping the lengths of the leading package and gap and adding the lengths of the last of the next four packages and gaps. In this way a new running sum of four package lengths and gaps is computed with each new package, and the speed can be adjusted at that repetition rate. The number of packages in the sum (four, in this example) is determined by the number of packages that the gapping conveyor can handle at one time.

Figure 5:
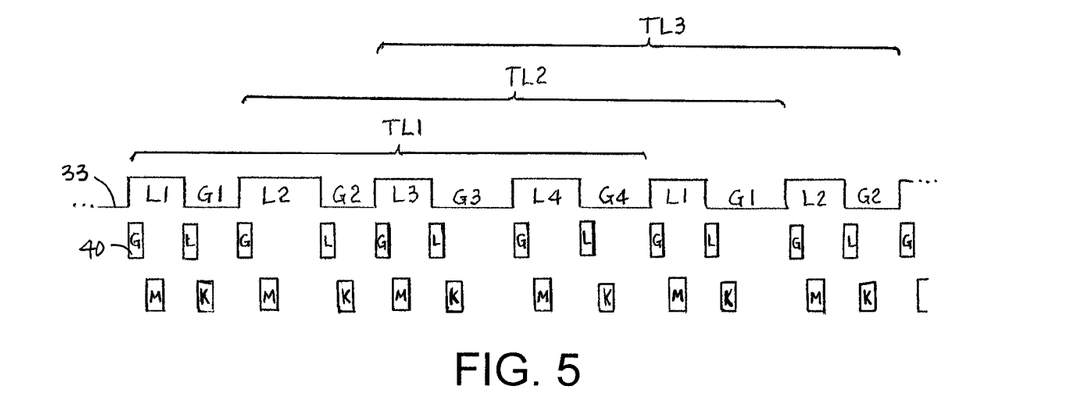
FIG. 5 is a timing diagram of one realization of a control scheme as in FIG. 4.

FIG. 5 is a timing diagram that shows a typical record of the output 33 of the sensor. The output sensor is shown as a high level L when a package is blocking the sensor's beam. The duration of the high level L is a measure of the length of the passing package. During interpackage gaps the sensor's output is a low level G. Of course, the sensor's output level could alternatively be low when the beam is blocked and high when not blocked.

Although there are many ways to implement the control program stored in the program memory and executed by the controller, the following example of one realization of the control program is provided to explain the operation of the conveyor system. Whenever a low-to-high or a high-to-low transition in the sensor output signal 33 is detected on the controller's edge-detecting input 34 (FIG. 3), an interrupt is generated by the controller that causes an interrupt service routine 40 in the controller's operating program to run. The time periods G, L during which the interrupt service routine runs are indicated by the rectangles in FIG. 5. On a rising edge of the sensor output signal 33, indicating the end of a gap and the leading edge of a package on the separation conveyor, the interrupt service routine's program steps G, which determine the length of the gap and start a length counter or timer to time the length of the package, are executed. The falling edge of the sensor signal 33, indicating the end of a package and the start of a new gap, is detected by the controller's edge-sensitive input 34 (FIG. 3), which generates an interrupt that causes the interrupt service routine 40 to run. On a falling edge, the routine executes program steps L to compute the length L of the package from the length counter's count and to reset a gap counter for measuring the duration of the next gap. Because the passages of packages and gaps past the sensing position along the separation conveyor do not coincide, a single counter could be used as both the gap counter and the package-length counter.

The interrupt service routine's rising-edge program steps G also bid a speed control task to run to adjust the speed Z of the infeed conveyor. The speed Z is adjusted depending on the length of the separation conveyor spanned by a string of N consecutive packages and the N gaps trailing (or leading) each of those packages. The predetermined number N of packages in the string is set by the number of packages that the gapping conveyor can handle at one time; i.e., the gapper's package capacity. In this example, N=4.

For a controller that does not have an edge-sensitive input 34 (FIG. 3) that generates an interrupt on both rising and falling edges, but that rather has a rising-edge-sensitive input and a falling-edge-sensitive input, the output of the sensor would be connected to both. In that case the gap-measuring routine G (running upon detection of a rising edge) and the package length-measuring routine L (running upon detection of a falling edge) would be separate interrupt service routines. Of course, it would also be possible to execute the code of the interrupt service routine or routines on a non-interrupt level by sampling the output of the sensor often enough to timely detect changes in the state of the sensor from high to low and vice versa. Under that scenario the sampling routine could bid a task that appropriately executes the G or the L, i.e., the gap or package-length measuring, program steps.

Figure 6:
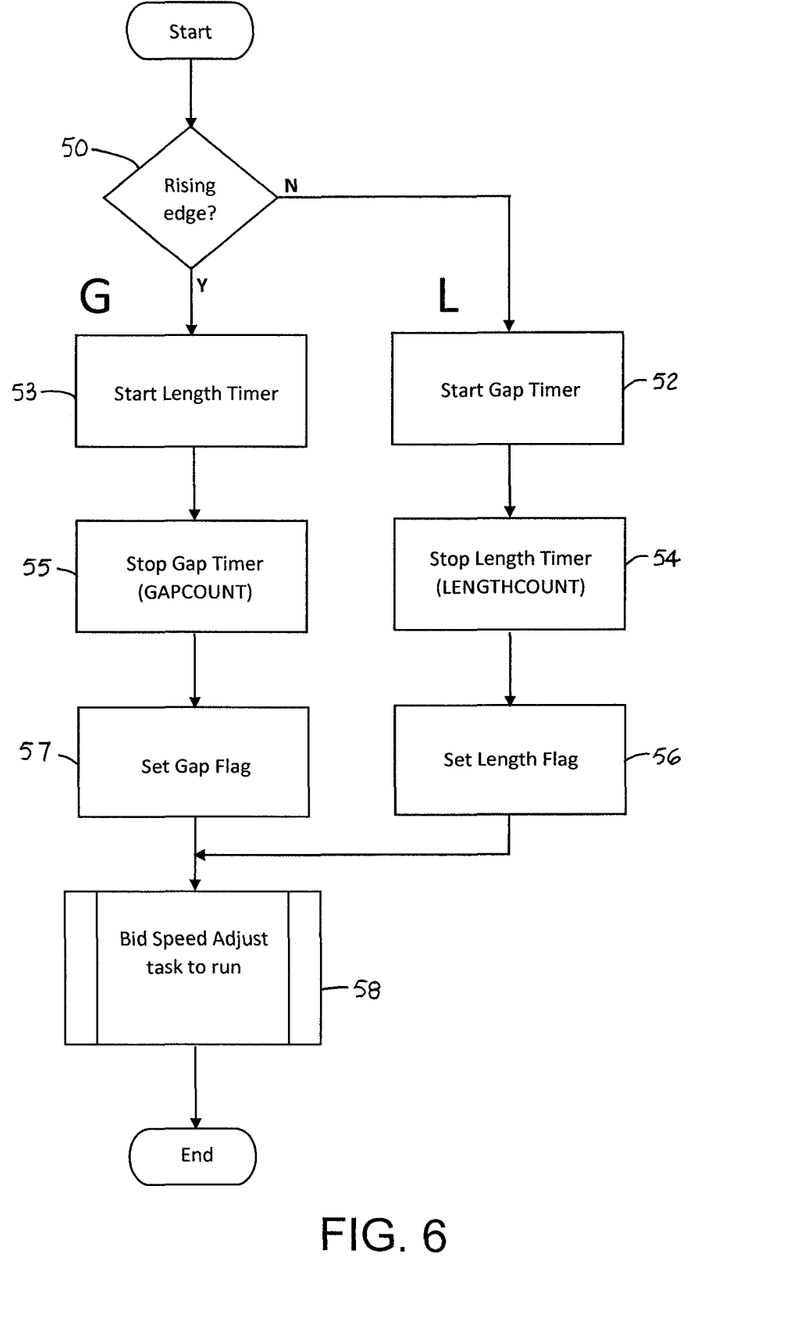
FIG. 6 is a flowchart of an exemplary interrupt service routine for measuring package and gap lengths in implementing the control scheme of FIG. 4.

A flowchart describing the operation of the G and L program paths in an interrupt service routine that runs on either a rising edge or a falling edge of the sensor signal is shown in FIG. 6. Upon detecting a rising or falling edge on the edge-detecting input, the controller's interrupt handler transfers program execution from an active task to the interrupt service routine. First, the routine determines at step 50 whether a rising edge or a falling edge of the sensor signal caused the interrupt. If a falling edge, indicating the end of a package and the start of a gap, caused the interrupt, the interrupt service routine follows path L and starts a gap timer in step 52. Before or after starting the gap timer, the routine stops a length timer in step 54. The count in the stopped length timer is a measure of the length (LENGTHCOUNT) of the most recently detected package. The routine also sets a length flag in step 56. The length flag indicates that a package length is available for the computation of the infeed speed. If, on the other hand, a rising edge of the sensor output signal, indicating the end of a gap and the detection of the leading edge of a package, caused the interrupt, the routine follows path G and starts the length timer at step 53, stops the gap timer at step 55, and sets a gap flag at step 57. The gap flag indicates that a gap length (GAPCOUNT) is available for the computation of the infeed speed. Then, regardless of whether the interrupt was caused by the leading edge or the trailing edge of a package, the routine, in step 58, bids a speed adjustment task to run. Then program execution exits the interrupt service routine and returns to the interrupted background task running when the interrupt was generated or to a pending higher priority task. Other tasks may include gapping-control and user-interface-handler tasks, for example.

Figure 7:
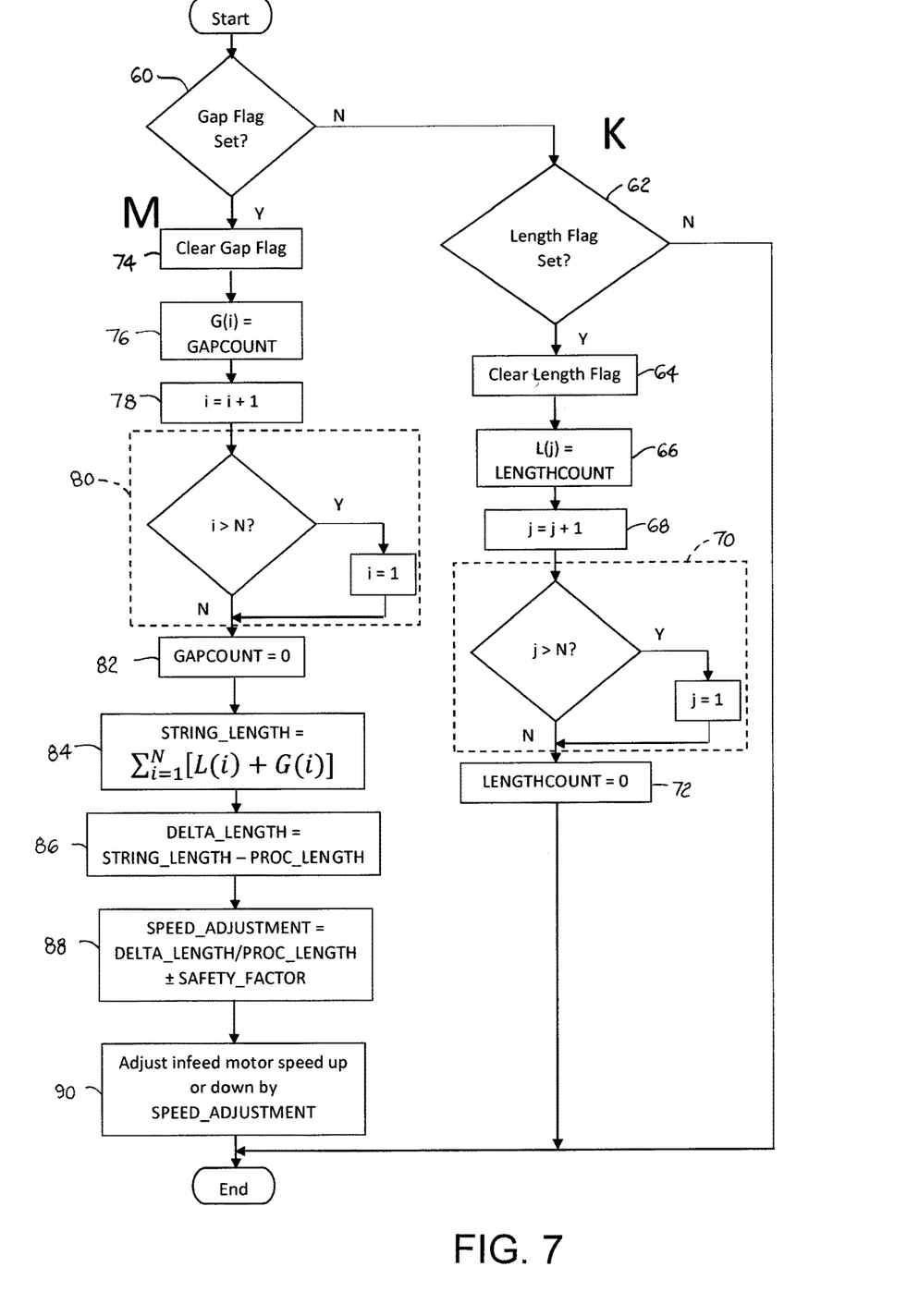
FIG. 7 is a flowchart of an exemplary infeed motor speed-adjustment control task for adjusting the speed of the infeed conveyor to maximize throughput in implementing the control scheme of FIG. 4.

The speed adjustment task, bid by the interrupt service routine and shown in the flowchart of FIG. 7, is scheduled to run by the controller's task manager. First, the task, at step 60, checks to see if the gap flag, indicating the end of a gap and the leading edge of the next package, is set. If not, the task, at step 62, follows path K and checks the state of the length flag. If it's not set, the task ends. If it is set, indicating the trailing end of a package and the start of a gap, the task, at step 64, clears the length flag set by the interrupt service routine. At step 66, the task stores the stopped count (LENGTHCOUNT) of the length timer in a circular buffer L(j) in the volatile memory, where j is an index into a buffer of N locations. Then the index j is incremented at step 68. If the index j exceeds the buffer length N, the index j is reset to 1 at step 70. Finally, at step 72, the count LENGTHCOUNT of the package-length timer is reset to zero in preparation for the leading edge of the next package. (By setting LENGTHCOUNT to zero before the start of the next package, i.e., by zeroing the length counter's count, the count of the length counter when the counter is stopped equals LENGTHCOUNT. But if the counter is not zeroed, LENGTHCOUNT can alternatively be computed as the difference between the counter's count at the start of the package and the count at the end of the package.) Then the task ends.

If, at the start of the task, the gap flag is set, the task follows path M and clears the gap flag at step 74. At step 76, the task stores the stopped count (GAPCOUNT) of the gap timer in a circular buffer G(i), where i is an index into a buffer of N locations. After incrementing the index i at step 78, the routine resets the index i to 1 if it exceeds N at step 80. The count GAPCOUNT of the gap timer is reset to zero at step 82 to prepare for measuring the next gap. Then the length (STRING_LENGTH) of the string of the previous N packages and the gaps following each are computed at step 84 by adding the contents of both circular buffers G(i), L(j). Thus, STRING_LENGTH is a running sum of a string of N package lengths and N gap lengths recomputed for the N most recent packages as each new package is measured. In other words the STRING_LENGTH computation in this example is realized by a finite impulse response (FIR) digital filter with equal coefficients for all the gap and package lengths. The string length is inversely proportional to the speed X of the infeed conveyor.

If the separation speed Y equals the processing speed Z, the string length (STRING_LENGTH) of the package string of N consecutive packages and their trailing gaps G on the separation conveyor is compared directly to the string length (PROC_LENGTH) of a string of N packages and their trailing gaps g on the processing conveyor. (If the speeds Y and Z are not equal, STRING_LENGTH is scaled by the factor Z/Y, the ratio of the processing speed to the separation speed, before being compared to PROC_LENGTH. Or, equivalently, PROC_LENGTH can be scaled by the reciprocal factor Y/Z.) The difference (step 86) in lengths (DELTA_LENGTH) represents a difference in speeds. The percent difference in the lengths (DELTA_LENGTH/PROC_LENGTH) spanned by the string of N packages on the separation conveyor and the same string on the processing conveyor relative to the length of the string of N packages on the processing conveyor is computed in step 88 and is used to determine a dynamic adjustment (SPEED_ADJUSTMENT) of, for example, that same length-difference percentage to the infeed conveyor's speed. The speed adjustment (SPEED_ADJUSTMENT), if down, is further lowered by an optional safety factor (SAFETY_FACTOR). If the speed adjustment is upward, it is decreased by an optional safety factor, which may be the same as or different from the safety factor for a slowdown. The speed of the infeed conveyor is sped up or down accordingly in step 90 by a motor speed signal sent over the controller's control output 36 (FIG. 3) to the motor or motors 38 driving the infeed conveyor. The length of the package string (PROC_LENGTH) of length N on the processing conveyor for the equi-gapped packages of FIG. 1 is computed as the sum of the lengths of the N packages plus Ng (the total length of N fixed gaps of length g). If an average package length is used, PROC_LENGTH can be treated as a constant for a given processing speed Z. For the equi-pitch processing conveyor of FIG. 2, the length of the package string (PROC_LENGTH) on the processing conveyor is a constant: N·P (the product of the number of packages and the package pitch).

The embodiments described in detail are used as examples for descriptive purposes. Alternatives exist. For example, the sensor used to measure package and gap lengths could be a proximity switch, a weight sensor, a visioning system, or any sensor capable of detecting package and gap lengths. As another example, the control program is described as adjusting the infeed speed by an amount equal to the length-difference percentage between packages on the separation conveyor and the processing conveyor plus or minus a predetermined safety factor. But other functional relationships between the speed adjustment and the lengths of the packages and the interpackage gaps are possible. For example, different safety factors could be used for different adjustment magnitudes or different safety factors could be used for speedups and slowdowns. Or the percentage speed adjustment could be less or more than the length-difference percentage. As another example, instead of recomputing the running sum as each new package is entered, the sum could be recomputed with every other new package or with the next group of N packages. Or as another alternative, the FIR filter used to compute STRING_LENGTH could be replaced with a recursive, or infinite impulse response (IIR), digital filter that computes a STRING_LENGTH from a previous STRING_LENGTH output as an input along with the new package and gap lengths appropriately weighted. For example, the IIR filter could be implemented as a lowpass filter in the speed adjust task by the recursion equation: STRING_LENGTH$_i$=A$\alpha$[L(i)+G(i)]+(1−$\alpha$)STRING_LENGTH$_{i-1}$, where 0<$\alpha$<1 and A is a constant equal to a string length N.

What is claimed is:
1. A conveyor system comprising:
an infeed conveyor conveying packages at an infeed speed;

a separation conveyor receiving the packages from the infeed conveyor and conveying the packages in a conveying direction at a separation speed greater than the infeed speed to separate consecutive packages across gaps;

a sensor detecting the lengths of the packages in the conveying direction at a sensing position on the separation conveyor and producing a sensor signal indicative of the lengths of the packages and the gaps;

a gapping conveyor receiving the packages from the separation conveyor and spacing the packages with a fixed gap length or with a fixed pitch;

a processing conveyor receiving the packages from the gapping conveyor and delivering the packages at a processing speed to a processing station;

a controller receiving the sensor signal to compute the lengths of the packages and the gaps on the separation conveyor, to compute a string length of a string of a predetermined number of consecutive separated packages and gaps from the computed lengths of the packages and the gaps, and to make a speed adjustment to the infeed speed as a function of the computed string length.

2. A conveyor system as in claim 1 wherein the predetermined number of packages equals the package capacity of the gapping conveyor.

3. A conveyor system as in claim 1 wherein the controller compares the string length along the separation conveyor occupied by the string of the predetermined number of consecutive packages and the gaps leading or trailing the consecutive packages to a string length along the processing conveyor occupied by a string of the predetermined number of consecutive packages and the gaps leading or trailing the consecutive packages.

4. A conveyor system as in claim 3 wherein the controller scales the string length along the separation conveyor occupied by the string of the predetermined number of consecutive packages and the gaps leading or trailing the consecutive packages by the ratio of the processing speed to the separation speed before comparing the string lengths.

5. A conveyor system as in claim 1 wherein the controller compares the string length along the separation conveyor occupied by the string of the predetermined number of consecutive packages and the gaps leading or trailing the consecutive packages to the product of the predetermined number of consecutive packages and the fixed pitch of the packages.

6. A conveyor system as in claim 1 wherein the controller adjusts the infeed speed as a function of the difference between the string length along the separation conveyor occupied by the string of the predetermined number of consecutive packages and the gaps leading or trailing the consecutive packages to a string length along the processing conveyor occupied by a string of the predetermined number of consecutive packages and the gaps leading or trailing the consecutive packages.

7. A conveyor system as in claim 1 wherein the controller computes the percent difference between (a) the string length along the separation conveyor occupied by the string of the predetermined number of consecutive packages and the gaps leading or trailing the consecutive packages and (b) a string length along the processing conveyor occupied by a string of the predetermined number of consecutive packages and the gaps leading or trailing the consecutive packages relative to the string length of the string along the processing conveyor and adjusts the infeed speed by that percentage.

8. A conveyor system as in claim 1 wherein the speed adjustment to the infeed speed includes a safety factor.

9. A conveyor system as in claim 1 wherein the controller filters the sensor signal in a recursive digital filter to compute a string length of a series of consecutive packages and gaps on the separation conveyor.

10. A method of controlling the supply of packages to a processing station, comprising:

conveying packages in a single file at an infeed speed;

separating the packages across interpackage gaps by accelerating the packages to a separation speed higher than the infeed speed on a separation conveyor;

measuring the lengths in a conveying direction of separated packages and the interpackage gaps leading or trailing the packages;

computing a string length of a string of a predetermined number of consecutive separated packages and interpackage gaps from the measured lengths;

adjusting the infeed speed as a function of the computed string length.

11. The method of claim 10 comprising:

equalizing the lengths of the interpackage gaps or equalizing the pitch of the packages after measuring the lengths;

then conveying the packages at a processing speed on a processing conveyor to a processing station.

12. The method of claim 11 comprising:

comparing the string length of the string of the predetermined number of consecutive separated packages and interpackage gaps to a string length of the predetermined number of packages and interpackage gaps on the processing conveyor; and adjusting the infeed speed down if the string length on the processing conveyor exceeds the string length on the separation conveyor and adjusting the infeed speed up if the string length on separation conveyor exceeds the string length on the processing conveyor.

13. The method of claim 12 wherein the string length of the string of the predetermined number of consecutive separated packages and interpackage gaps is scaled by the ratio of the processing speed to the separation speed.

14. The method of claim 10 wherein the string length of the string is computed in a FIR digital filter as the sum of the lengths of the predetermined number of consecutive separated packages and interpackage gaps with equal coefficients for the lengths of the packages and the interpackage gaps.

15. The method of claim 10 wherein the string length is computed in a recursive digital filter whose inputs are the previously computed string length and the measured lengths of the most recently measured package and the most recently measured interpackage gap.

16. The method of claim 10 wherein a new string length is computed as the length of each new package is measured.

* * * * *